Figure 1:
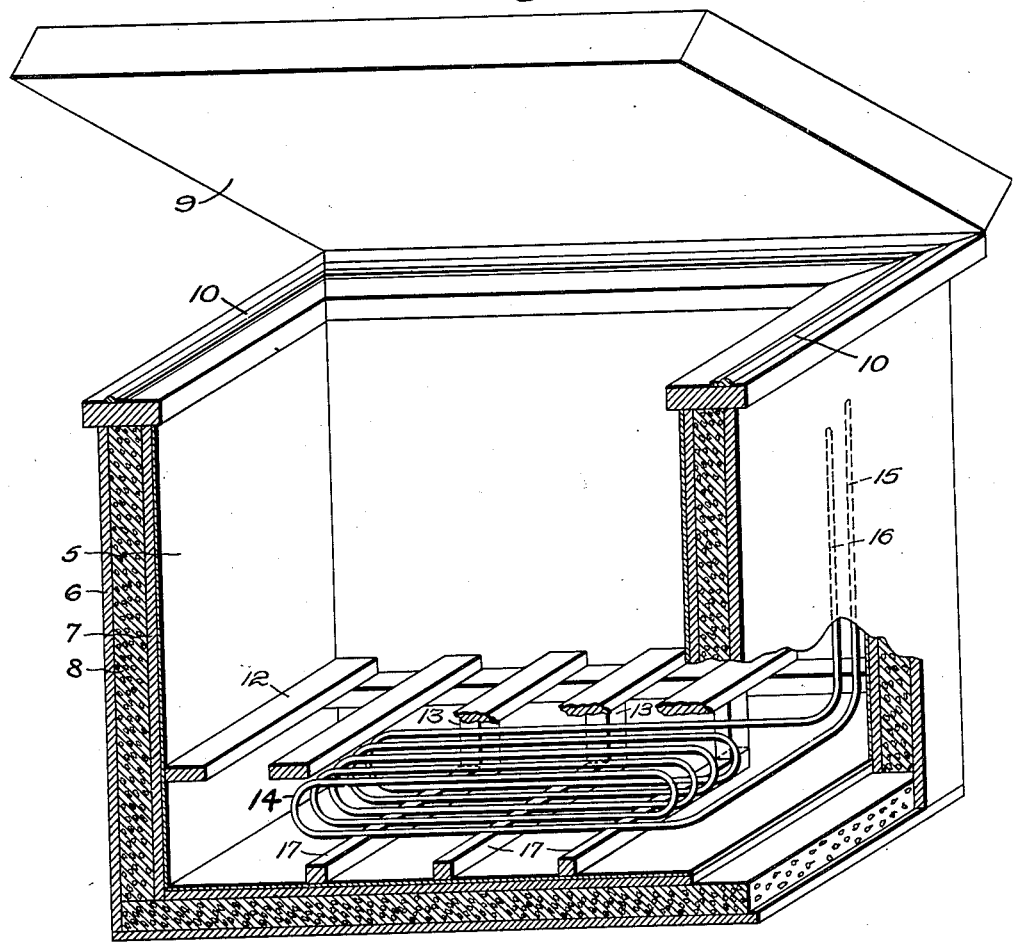

Aug. 30, 1932.　　W. M. ROBERTSON　　1,875,264
METHOD OF COOLING MILK AND OTHER BEVERAGES
Filed April 5, 1930

Inventor:
Warren M. Robertson
by Emery, Booth, Varney & Townsend
Attys

Patented Aug. 30, 1932

1,875,264

UNITED STATES PATENT OFFICE

WARREN M. ROBERTSON, OF REVERE, MASSACHUSETTS

METHOD OF COOLING MILK AND OTHER BEVERAGES

Application filed April 5, 1930. Serial No. 441,882.

This invention relates to a novel method of cooling milk and other beverages. The invention will be best understood by reference to the following description, when taken in connection with the accompanying drawing of one specific apparatus for carrying out the method, while its scope will be more particularly pointed out in the appended claims.

Figure 2:
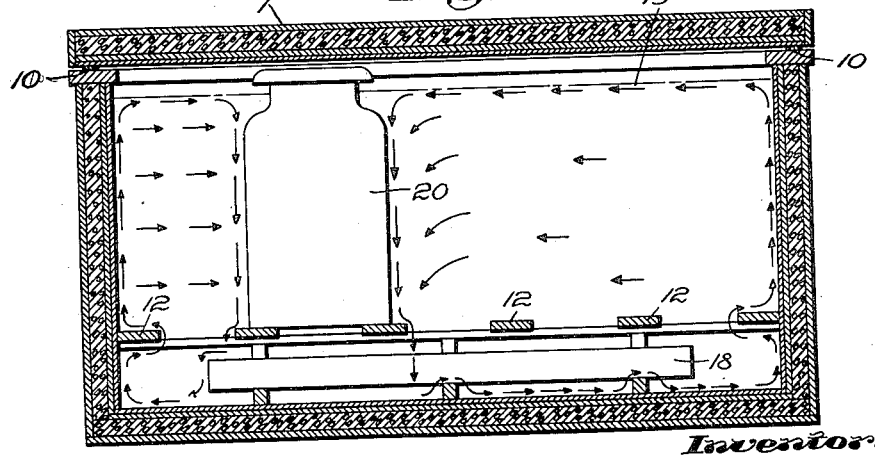

In the drawing:

Fig. 1 is a perspective view of one specific apparatus by which the method may be practised; and Fig. 2 is a somewhat diagrammatic, sectional view, illustrating the method.

Referring to the drawing, and to the apparatus illustrated therein for practising the method, there is shown a tank 5, herein made of sheet metal, built into an insulating box, comprising outer and inner walls 6 and 7 of wood, with appropriate insulating material 8, such as cork, interposed between the walls. A similarly constructed cover 9 is hinged to the body of the box. An air seal is provided by a strip 10 of appropriate compressible material, such as felt, applied to a top rail or sill 11 of the body. When the cover is lowered upon this strip, interchange of air between the outer atmosphere and the interior of the box is prevented, or at least is kept at a minimum.

To support the milk cans, there is provided within the tank near the bottom thereof an appropriate support, such as a grid or grating 12, placed at a sufficient height above the bottom of the tank to permit of the placing of a suitable cooling element between the bottom of the grating and the bottom of the tank. This grating is conveniently supported on and secured to posts 13 at the sides of the tank. In the present instance, this cooling element is a coil, or rather a series of coils 14, having inlet and outlet portions 15 and 16, which are led out of the tank and are a part of a refrigeration system of the compressor, condenser, expander circuit type, in which a refrigerant, such as methyl chloride, or sulphur dioxide, is circulated by a compressor driven by the electric motor, the operation of which is controlled by an automatic controller such as a thermostat, which through the control of the motor automatically maintains the temperature within the desired limit, hereinafter indicated.

The coils are suitably spaced from the bottom of the tank and from the grating, the spacing above and below in practice being approximately 3". Herein, the coils rest upon bars or cleats 17 on the bottom of the tank. The length of the coil depends upon the quantity of milk to be cooled. In practice, the proportions of the parts are such that after the tank is filled with water, there is formed on the coils a cake of ice 18 (see Fig. 2), which in practice is approximately 10" thick.

The tank is kept filled to a suitable height with water 19, the height being determined by the height of the milk cans 20, the surface of the water being just below the tops of the cans. The liquid used is water, because the temperature at which it freezes is practically the same as that of milk, and the conditions must be such that the milk will not freeze, as frozen milk is rejected by the milk contractors. On the other hand, there is a State requirement that the milk shall be delivered to the contractors for shipment in the milk cars at a temperature at least as low as 50 degrees F.

In the past, it has been found extremely difficult to meet these requirements, particularly in the case of milk taken from the cows at 90 degrees F. in the late afternoon or early evening, and delivered to the milk stations in the early morning. According to former practices, using the best refrigerating systems available and of ample size, the time for cooling milk from 90 degrees F. to 50 degrees F. has been approximately one and one-half hours, and to bring it down to 35 degrees F. has consumed approximately eight hours. To cool milk from 65 degrees F. to 50 degrees F. has occupied approximately one hour, and to bring it down to 35 degrees F. has taken approximately seven hours. Even these results have been accomplished only by using relatively large refrigerating machines, and by running them continuously for the full time of the cooling operation.

By the use of my method, I have been able to reduce these times very materially, by the employment of a relatively small refrigerating machine. As a matter of fact, I have been able to reduce the time of cooling milk from a temperature of 90 degrees F. to a temperature of 35 degrees F. to only one hour, whereas by the use of former methods, such unsatisfactory results have been achieved that, in many cases, users have rejected refrigerating plants and have had them taken out. As compared with the use of ice refrigerators, the cooling period is not only radically reduced, but there is an enormous saving in the cost of the electricity as compared with the cost of the ice used, to say nothing of the labor cost in the handling of the ice.

These remarkable results which I have obtained have been accomplished by simply placing the cooling element beneath the cans, and by maintaining the temperature of the water about the cans at least as low as the point of maximum density of the water, and not lower than the freezing point of water. More specifically, the temperature of the water is maintained between 0 degrees C. and 4 degrees C., which is equivalent to the range between 32 degrees F. and 39.2 degrees F. The maximum density of water is at 39.2 degrees F. From that point down to 32 degrees F., its density gradually decreases. Advantage is taken of this fact to produce a circulation which is exactly the reverse of former practice.

Before the cans are placed in the tank, the refrigerating machine is started, and is continued in operation until a substantial cake of ice, in practice about 10″ thick, has been formed on the coils. The cans are then placed upon the grating above the ice cake, and the cover of the box is closed. Then, by keeping the water between its point of maximum density and the freezing point, there is a downward circulation of the water about the sides of the cans (see Fig. 2) to the ice cake, where the warm water is cooled, and it then rises to the surface. In other words, the water cooled by contact with the ice cake, and then having a temperature of approximately 32 degrees F. and being lighter than the warm water, rises along the sides of the tank, passes thence to the sides of the cans, and, warmed by contact therewith, descends along the sides of the can to the ice cake, where it is again cooled, and the cycle is repeated.

As already indicated, the use of the described method results in the accomplishment of a radical reduction in the time occupied by the cooling operation, and a corresponding reduction in the consumption of electric current. By the use of a refrigerating machine of relatively small size, I have been enabled to reduce the cooling period of milk from 90 degrees F. to 35 degrees F., to one hour or less. At the end of this period, the thermostat stops the motor, and the temperature of the milk remains at approximately 35 degrees F. for several hours. Of course, this results in a very great saving in current consumption. Of course, if desired, the machine might be reduced in size and capacity, and hence its initial cost reduced, if the user were willing to increase the cooling period somewhat. However, no matter which way advantage is taken of my improved method, there is a very great saving of expense.

Having thus described one embodiment of the invention, but without limiting myself thereto, what I claim and desire by Letters Patent to secure is:

1. The method of cooling a body, which comprises placing the body in a liquid whose freezing point is approximately the same as that of water, in which liquid there is a submerged mechanical refrigerating element below the body, and utilizing the refrigerating element to maintain the temperature of the liquid within a range which will cause a circulation of the liquid downwardly about the sides of the body vertically, directly to and thence horizontally along the top of the refrigerating element and thence upwardly at points relatively remote from the body.

2. The method of cooling a body, which comprises placing the body in a liquid whose freezing point is approximately the same as that of water, in which liquid there is a submerged expander of a compressor, condenser, expander circuit below the body, and utilizing the expander to maintain the temperature of the liquid within a temperature range from 0° to 4° centigrade, thereby to cause a circulation of the liquid downwardly about the sides of the body directly to and along the expander and thence upwardly at points relatively remote therefrom.

3. The method of cooling a body, which comprises placing the body in a bath of water in which there is an expander of a compressor, condenser, expander circuit below the body, and utilizing the expander to maintain the temperature of the water within a range which will cause a circulation of the liquid downwardly about the sides of the body directly to and along the expander and thence upwardly at points relatively remote from the body.

4. The method of cooling milk, which comprises placing the milk container in a bath of liquid whose freezing point is approximately the same as that of the milk and in which liquid there is a submerged expander of a compressor, condenser, expander circuit below the container, and utilizing the expander to maintain the temperature of the water within a range which will cause a circulation of the liquid downwardly about the sides of the container directly to and along the expander and thence upwardly at points relatively remote from the container.

5. The method of cooling milk, which comprises placing the milk container in a bath of water in which there is a submerged expander of a compressor, condenser, expander circuit below the container, and utilizing the expander to maintain the temperature of the water above the freezing point and at least as low as the point of maximum density of the water thereby to cause a downward flow of the water about the sides of the container directly to the expander.

6. The method of cooling a body, which comprises circulating a refrigerant through an expander of a compressor, condenser, expander circuit which expander is submerged in a liquid whose freezing point is approximately the same as that of water, thereby to form an ice cake on the expander and placing the body to be cooled in the water above the ice cake, whereby the heavier water, warmed by contact with the body, descends about the sides of the latter directly to the ice cake where it is cooled and rendered lighter and rises at points relatively remote from the body.

In testimony whereof, I have signed my name to this specification.

WARREN M. ROBERTSON.